L. B. WINSLOW.
Improvement in Eye-Glasses.
No. 132,612.  Patented Oct. 29, 1872.
Fig. 1.
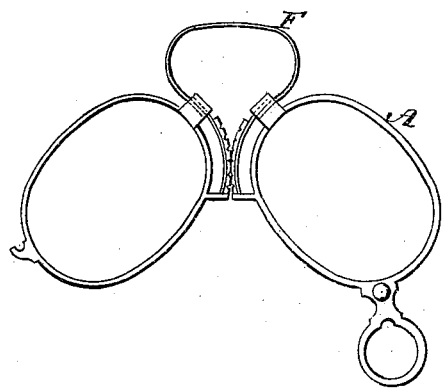
Fig. 5.
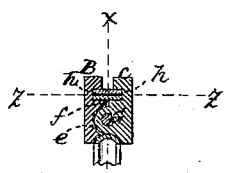
Fig. 4.   Fig. 3.   Fig. 2.
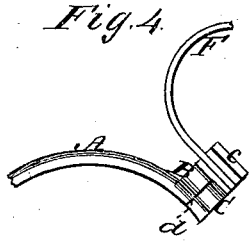 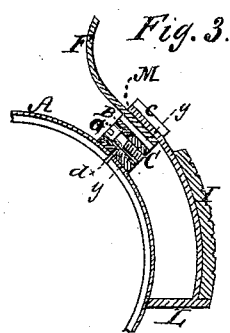 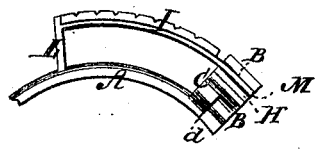
Fig. 6.
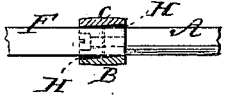
Witnesses:  
E. Wolff  
C. Sedgwick
Inventor:  
L. B. Winslow  
per Munn  
Attorneys.

UNITED STATES PATENT OFFICE.

LUCIUS B. WINSLOW, OF NEW YORK, N. Y.

IMPROVEMENT IN EYE-GLASSES.

Specification forming part of Letters Patent No. 132,612, dated October 29, 1872.

*To all whom it may concern:*

Be it known that I, LUCIUS B. WINSLOW, of the city, county, and State of New York, have invented a new and useful Improvement in Eye-Glasses, of which the following is a specification:

My invention consists in so forming the joints of the glass bows and arranging the connecting spring therewith that the screw for fastening the ends of the bow and securing the glass also fastens the spring to the bow, and holds it so that it can be adjusted to lengthen or shorten it and thereby vary its tension, all as hereinafter described.

In the accompanying drawing, Figure 1 is a plan view of a pair of eye-glasses, constructed according to my improvements. Fig. 2 is a plan view of a section of one of the glass bows enlarged. Fig. 3 is a section of part of one of the glass bows and the connecting spring taken in the plane of the glass on the line $x\ x$ of Fig. 5. Fig. 4 is a side elevation of a section of one of the glass bows and the spring. Fig. 5 is a cross-section through the connecting-joint of a glass bow taken on the line $y\ y$ of Fig. 3; and Fig. 6 is a section of Fig. 5 taken on the line $z\ z$.

Similar letters of reference indicate corresponding parts.

A represents one of the glass bows, which is provided with a lug or enlargement, B, at one end, and C at the other, which meet and are jointed together on the lines $d\ e\ f$, and are fastened by a screw-bolt, G, passing through B and screwing into C in the plane of the glass, so as to draw the bow snugly down upon its edges. Outside of the bolt these lugs face each other along the line $f$ in the plane of the glass, and each has a narrow groove, H, adapted to receive one edge of the spring F, as shown in the drawing, and these grooves are beveled on the bottom in opposite directions, as shown in Fig. 6, so that when the lugs B and C are drawn together by the screw-bolts they bind or clamp the spring between them, so as to hold it at any point along its length, as required, so that it may be readily shifted to vary the length of the bow or bridge which spans the nose and vary the tension of the spring. This mode of connecting the spring to the bows is alike applicable whether the spring be detached and separate from the nose-clamps I or connected to them, as it may be, if preferred, but when so connected the nose-pieces are not connected to the bows at one end, as now shown at L, the said pieces L being in this case merely butted against the bows so as to slide on them, and said nose pieces will not be connected to a lug as they are in this case, as shown at M.

Having thus described my invention, I claim as new and desire to secure by Letters Patent—

The arrangement of the lugs B C of the glass bow A to join on the line $d\ e\ f$, and with the grooves H for securing the glass, and connecting to the spring F by the screw-bolt G, substantially as specified.

LUCIUS B. WINSLOW.

Witnesses:
ANSON P. THAYER,
T. B. MOSHER.